United States Patent
Bahirat et al.

(10) Patent No.: US 10,915,443 B2
(45) Date of Patent: Feb. 9, 2021

(54) ALLOCATION OF OVERPROVISIONED BLOCKS FOR MINIMIZING WRITE AMPLIFICATION IN SOLID STATE DRIVES

(71) Applicant: Micron Technology, Inc., Boise, ID (US)

(72) Inventors: Shirish D. Bahirat, Longmont, CO (US); William Akin, Morgan Hill, CA (US); Aditi P. Kulkarni, Boulder, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/662,504

(22) Filed: Oct. 24, 2019

(65) Prior Publication Data

US 2020/0057716 A1  Feb. 20, 2020

Related U.S. Application Data

(63) Continuation of application No. 15/985,167, filed on May 21, 2018, now Pat. No. 10,496,533.

(51) Int. Cl.
| | | |
|---|---|---|
| G06F 12/00 | (2006.01) | |
| G06F 12/02 | (2006.01) | |
| G06F 3/06 | (2006.01) | |

(52) U.S. Cl.
CPC .......... *G06F 12/0246* (2013.01); *G06F 3/064* (2013.01); *G06F 3/0679* (2013.01); *G06F 12/0253* (2013.01); *G06F 2212/7201* (2013.01)

(58) Field of Classification Search
CPC .. G06F 12/0246; G06F 12/0253; G06F 3/064; G06F 3/0679; G06F 3/061; G06F 3/0631; G06F 2212/7201
See application file for complete search history.

(56) References Cited

U.S. PATENT DOCUMENTS

2016/0313922 A1* 10/2016 Kojima ................. G06F 3/0616

OTHER PUBLICATIONS

Agarwal, Arjiv and Marrow, Marcus, IEEE Globecom 2010 Workshop and Application of Communication Theory to Emerging Memory Technologies, "A closed-form expression for Write Amplification in NAND Flash", pp. 1846-1850, 2010.

(Continued)

*Primary Examiner* — Shawn X Gu
(74) *Attorney, Agent, or Firm* — Lowenstein Sandler LLP

(57) ABSTRACT

Systems and methods for allocation of overprovisioned blocks for minimizing write amplification in solid state drives are disclosed. An example system comprises: a plurality of memory devices and a controller operatively coupled to the memory devices, the controller configured to: determine a first value of a data stream attribute associated with a first data stream; determine a second value of the data stream attribute associated with the second data stream; determine, based on the first value and the second value, a first overprovisioning factor associated with the first data stream and a second overprovisioning factor associated with the second data stream, wherein the first overprovisioning factor and the second overprovisioning factor are calculated to provide a uniform distribution of valid translation unit counts (VTCs) across the first data stream and the second data stream; and allocate, based on the first overprovisioning factor and the second overprovisioning factor, a first plurality of overprovisioned blocks to the first data stream and a second plurality of overprovisioned blocks to the second data stream.

20 Claims, 8 Drawing Sheets

(56) References Cited

OTHER PUBLICATIONS

Hu, Xiao-Yu et al., "Write Amplification Analysis in Flash-Based Solid State Drives", 9 pages, May 4, 2009.

* cited by examiner

|  | 500A | 500B | 500C | 500D | 500E | 500F | 500G |
|---|---|---|---|---|---|---|---|
| 510 | Stream 1 | Stream 2 | Stream 3 | Stream 4 | Stream 5 | Stream 6 | Stream 7 |
|  | 0.14 | 0.18 | 0.13 | 0.2 | 0.1 | 0.15 | 0.1 |
|  | 18.0486 | 8.9844 | 21.7429 | 7.17916 | 4.15925 | 14.419 | 44.1383 |
|  | 9.28143 | 4.75693 | 11.1273 | 3.85829 | 2.36378 | 7.46849 | 22.322 |
|  | 6.36219 | 3.3543 | 7.59141 | 2.75959 | 1.7801 | 5.15563 | 15.0512 |
|  | 4.90495 | 2.65783 | 5.82542 | 2.21637 | 1.49896 | 4.00219 | 11.4167 |
|  | 4.03249 | 2.2438 | 4.76739 | 1.89525 | 1.3384 | 3.31249 | 9.23682 |
|  | 3.45242 | 1.97094 | 4.06333 | 1.68512 | 1.2377 | 2.85467 | 7.78418 |
|  | 3.03943 | 1.77872 | 3.56155 | 1.53831 | 1.17079 | 2.52933 | 6.74713 |
|  | 2.73085 | 1.63684 | 3.18618 | 1.43101 | 1.12461 | 2.28678 | 5.96981 |
|  | 2.49188 | 1.5285 | 2.89509 | 1.34996 | 1.0919 | 2.09943 | 5.36566 |
|  | 2.30163 | 1.44358 | 2.66299 | 1.28723 | 1.06829 | 1.95069 | 4.88272 |
|  | 2.14681 | 1.37566 | 2.47378 | 1.2477 | 1.05104 | 1.83003 | 4.48793 |
|  | 2.01855 | 1.32045 | 2.31675 | 1.19803 | 1.0383 | 1.73042 | 4.15925 |
|  | 1.91072 | 1.27498 | 2.18446 | 1.16587 | 1.02882 | 1.64699 | 3.88143 |
|  | 1.81894 | 1.23711 | 2.0716 | 1.13954 | 1.02174 | 1.57626 | 3.64357 |
|  | 1.73999 | 1.2053 | 1.9743 | 1.11782 | 1.01643 | 1.51569 | 3.43768 |
|  | 1.67146 | 1.17838 | 1.88963 | 1.09977 | 1.01243 | 1.46335 | 3.25776 |
|  | 1.61151 | 1.15544 | 1.81535 | 1.08469 | 1.00941 | 1.41779 | 3.09923 |
|  | 1.5587 | 1.13579 | 1.74973 | 1.07205 | 1.00713 | 1.37787 | 2.95852 |
|  | 1.51189 | 1.11888 | 1.69141 | 1.0614 | 1.00541 | 1.34268 | 2.83282 |
|  | 1.4702 | 1.10426 | 1.63928 | 1.0524 | 1.0041 | 1.31151 | 2.71988 |
|  | 1.43287 | 1.0916 | 1.59246 | 1.04477 | 1.00311 | 1.28378 | 2.61787 |
|  | 1.39931 | 1.08058 | 1.55022 | 1.0383 | 1.00236 | 1.259 | 2.52531 |
|  | 1.36902 | 1.07097 | 1.51196 | 1.03279 | 1.00179 | 1.23673 | 2.44095 |
|  | 1.34159 | 1.06258 | 1.47718 | 1.02809 | 1.00136 | 1.2168 | 2.36379 |
|  | 1.31667 | 1.05523 | 1.44545 | 1.02408 | 1.00103 | 1.19878 | 2.29294 |
|  | 1.29397 | 1.04878 | 1.41644 | 1.02066 | 1.00079 | 1.18248 | 2.22768 |
|  | 1.27323 | 1.04312 | 1.38982 | 1.01773 | 1.0006 | 1.1677 | 2.1674 |
|  | 1.25424 | 1.03814 | 1.36534 | 1.01522 | 1.00045 | 1.15427 | 2.11155 |
|  | 1.23682 | 1.03375 | 1.34278 | 1.01308 | 1.00034 | 1.14205 | 2.05968 |
|  | 1.2208 | 1.02988 | 1.32194 | 1.01123 | 1.00026 | 1.13091 | 2.01139 |
|  | 1.20605 | 1.02647 | 1.30265 | 1.00965 | 1.0002 | 1.12074 | 1.96633 |
|  | 1.19243 | 1.02345 | 1.28476 | 1.0083 | 1.00015 | 1.11143 | 1.92421 |
|  | 1.17985 | 1.02079 | 1.26816 | 1.00713 | 1.00011 | 1.10291 | 1.88474 |
|  | 1.16821 | 1.01843 | 1.25271 | 1.00613 | 1.00009 | 1.09509 | 1.84771 |
|  | 1.15743 | 1.01635 | 1.23831 | 1.00528 | 1.00007 | 1.08792 | 1.81289 |
|  | 1.14742 | 1.0145 | 1.22489 | 1.00454 | 1.00005 | 1.08132 | 1.7801 |
|  | 1.13812 | 1.01287 | 1.21235 | 1.0039 | 1.00004 | 1.07526 | 1.74919 |

FIG. 5A

ALLOCATION OF OVERPROVISIONED BLOCKS FOR MINIMIZING WRITE AMPLIFICATION IN SOLID STATE DRIVES

RELATED APPLICATIONS

This application is a continuation of U.S. patent application Ser. No. 15/985,167 filed on May 21, 2018, which is incorporated by reference herein.

TECHNICAL FIELD

The present disclosure generally relates to storage systems, and more specifically, relates to allocation of overprovisioned blocks for minimizing write amplification in solid state drives.

BACKGROUND

A storage device, such as a solid-state drive (SSD), may include one or more volatile and non-volatile memory devices. The SSD may further include a controller that may manage allocation of data on the memory devices and provide an interface between the memory devices and the host computer system.

BRIEF DESCRIPTION OF THE DRAWINGS

The present disclosure will be understood more fully from the detailed description given below and from the accompanying drawings of various implementations of the disclosure.

FIGS. 5A-5B schematically illustrate example simulation results for several data streams having various data invalidation rates, in accordance with one or more aspects of the present disclosure;

DETAILED DESCRIPTION

Figure 1:
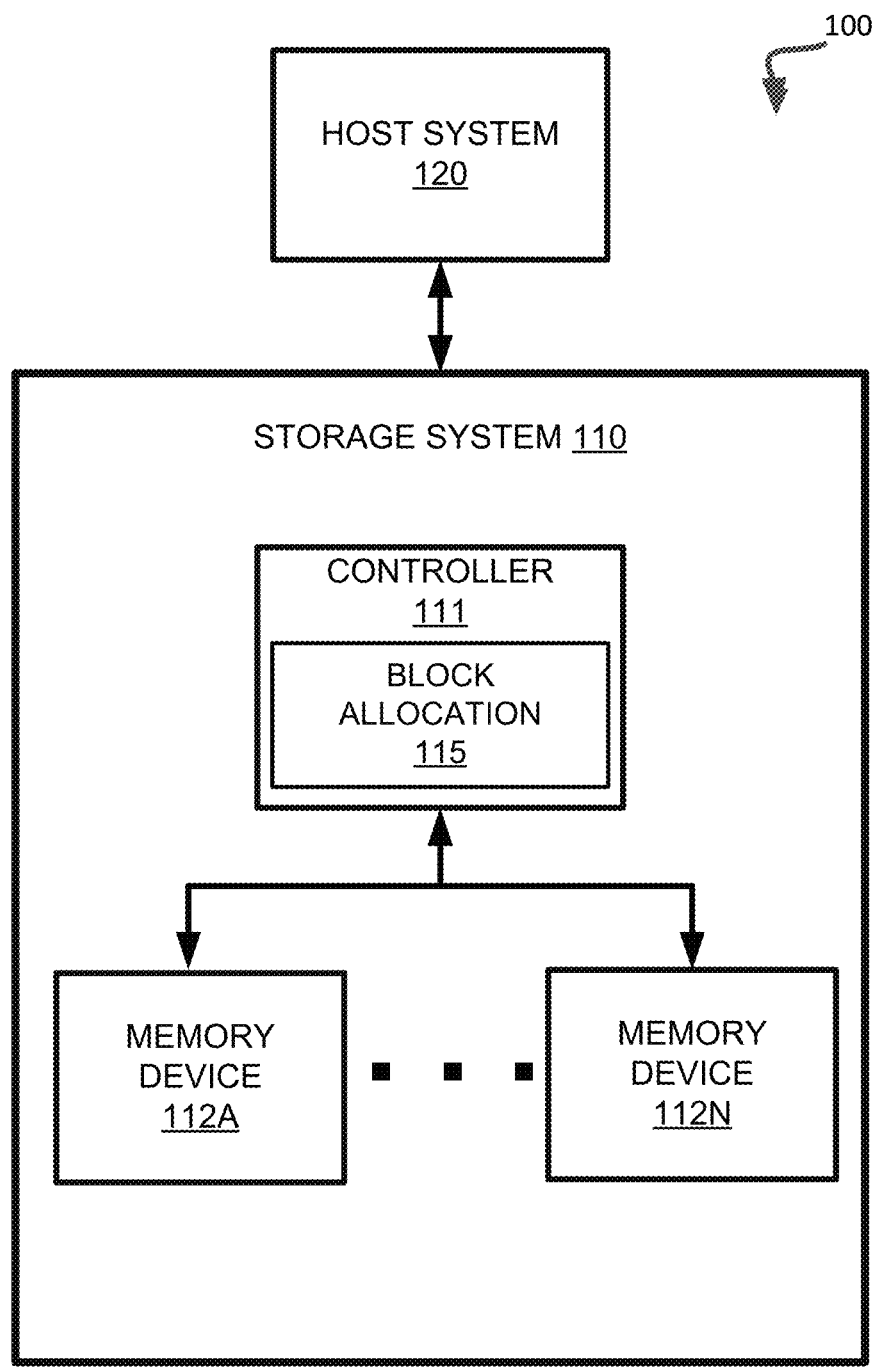
FIG. 1 schematically illustrates an example computing environment operating in accordance with one or more aspects of the present disclosure.

Aspects of the present disclosure are directed to methods of allocation of overprovisioned blocks for minimizing write amplification in solid state drives.

An example storage system may be represented by a solid state drive (SSD) including multiple memory devices having various storage media types, including negative-and (NAND) flash memory (utilizing single-level cell (SLC), triple-level cell (TLC), and/or quad-level cell (QLC) blocks). A NAND flash memory device may store multiple memory blocks, such that each block includes a fixed number memory pages (e.g., 64 pages of 4 kilobytes). "Overprovisioning" herein shall refer to allocating a number of physical memory blocks which exceeds the logical capacity presented as available memory to the host.

A page is an elementary unit for read or write operations. However, a page should be erased before it can be written to, and a memory erase operation may only be performed on a whole block, even if a single page of data needs to be erased. This difference in the granularity of write and erase operations leads to the phenomenon referred to as "write amplification," which manifests itself by the amount of physical data to be written to the storage media being a multiple of the logical amount of data manipulated by the host.

For improving the memory device performance, the SSD controller may implement the relocate-on-write strategy, according to which a new data item replacing or modifying an existing data is written to a new physical location, thus invalidating the old physical location holding the data being overwritten. However, while improving the memory device performance, the relocate-on-write strategy necessitates reclaiming the invalidated memory locations, which is also referred to as "garbage collection." The garbage collection may result in additional read and write operations (as valid memory pages from a block being reclaimed would need to be moved to another block), thus contributing to the write amplification. Therefore, the garbage collection strategy implemented by the device controller may be directed to minimizing the write amplification. In certain implementations, the garbage collection strategy may be further directed at optimizing the wear leveling, by yielding a uniform distribution of programming and erasing cycles across the storage media.

In certain implementations, the garbage collection process may select a block having the minimum, among all blocks, number of valid pages. Valid memory pages of the selected "victim" block may be relocated to another block, and the whole victim block may be erased. However, selecting the block having the minimum number of valid pages may not always yield the optimal efficiency (e.g., measured by the write amplification), since the data invalidation rate may differ significantly among blocks allocated to different data streams.

"Data stream" herein shall refer to a group of data items sharing one or more data attributes, including attributes that reflect expected or actual media usage patterns. Examples of such attributes include the data retention time or the data invalidation rate (also referred to as the "stream temperature," such that a "cold" stream mostly includes data items having a relatively large retention time (and, consecutively, a relatively low data invalidation rate), while a "hot" stream mostly includes data items having a relatively small retention time (and, consecutively, a relatively high data invalidation rate)).

In an illustrative example, the data invalidation rate of data items of a cold data stream may be significantly lower than the data invalidation rate of data items of a hot data stream. In a hypothetical example, if each of the two data streams has a block with the lowest count of valid pages among all blocks, the garbage collection process may base the decision of the two blocks to choose on the respective data stream temperatures. As the data invalidation rate is higher for the hot data stream, the likelihood of a block of the hot data stream becoming free (due to eventual invalidation of the remaining few valid pages) within a certain period of time is higher than the likelihood of a block of the cold data stream becoming free within the same period of time. Accordingly, an efficient garbage collection strategy choosing among two blocks having the same or similar number of valid pages would choose the victim block from the cold data stream.

The garbage collection process may be initiated responsive to determining that the number of available physical blocks (including the overprovisioned blocks) allocated to a particular data stream falls below a pre-defined threshold. Therefore, increasing the number of overprovisioned blocks effectively increases the number of invalid pages which may exist before the garbage collection needs to be performed. Accordingly, a uniform distribution of valid page counts (also referred to as valid translation unit (TU) counts, or VTCs) across all media blocks may be achieved by allocating overprovisioned blocks on a per-stream basis, thus yielding consistent write amplification by all currently active data streams. In an illustrative example, the storage device controller may determine overprovisioning factors associated with each of two or more data streams that would minimize the differences between the expected write amplification factors associated with the data streams, and may allocate overprovisioned blocks to the data streams in accordance with calculated overprovisioning factors. "Overprovisioning factor" herein shall refer to the ratio of the number of physical memory blocks to the number of logical memory blocks presented as available memory to the host.

Thus, aspects of the present disclosure represent significant improvements over various common implementations of storage systems, by allocating overprovisioned blocks to data stream based on data attributes (such as the expected retention time or data invalidation rate), in order to optimize performance, endurance, and/or other operational aspects of the storage media. Various aspects of the above referenced methods and systems are described in details herein below by way of examples, rather than by way of limitation.

FIG. 1 schematically illustrates an example computing environment 100 operating in accordance with one or more aspects of the present disclosure. In general, the computing environment 100 may include a host system 120 that uses the storage system 110. For example, the host system 120 may write data to the storage system 110 and read data from the storage system 110. The host system 120 may be a computing device such as a desktop computer, laptop computer, network server, mobile device, or such computing device that includes a memory and a processing device. The host system 120 may include or be coupled to the storage system 110 so that the host system 120 may read data from or write data to the storage system 110. For example, the host system 120 may be coupled to the storage system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface may be used to transmit data between the host system 120 and the storage system 110. The host system 120 may further utilize an NVM Express (NVMe) interface to access the memory devices 112A-112N when the storage system 110 is coupled with the host system 120 by the PCIe interface. In an illustrative example, the host system 120 may be represented by the computer system 800 of FIG. 8.

As shown in FIG. 1, the storage system 110 may include a controller 111 and memory devices 112A-112N. In certain implementations, the memory devices 112A-112N may include non-volatile memory devices. For example, the memory devices 112A-112N may be a negative-and (NAND) type flash memory. A memory device 112 may include one or more arrays of memory cells such as single level cells (SLCs) or multi-level cells (MLCs) (e.g., triple level cells (TLCs) or quad-level cells (QLCs)). In certain implementations, a particular memory device may include both SLC memory cells and MLC memory cells. Each of the memory cells may store one or more bits of data (e.g., data blocks) used by the host system 120. Although non-volatile memory devices such as NAND type flash memory are described, the memory devices 112A-112N may include any other type of non-volatile memory or volatile memory devices. For example, the memory devices 112A-112N may include random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. The memory devices 112A-112N may include any combination of the different types of non-volatile memory or volatile memory. Furthermore, the memory cells of the memory devices 112A-112N may be grouped as memory pages or data blocks that may refer to a unit of the memory device used to store data.

The controller 111 may communicate with the memory devices 112A-112N to perform operations such as reading data, writing data, or erasing data at the memory devices 112A-112N and other such operations. Furthermore, the controller 111 may include hardware such as one or more integrated circuits and/or discrete components, a processing device, a buffer memory, software such as firmware or other instructions, or a combination thereof. In general, the controller 111 may receive commands or operations from the host system 120 and may convert the commands or operations into instructions or appropriate commands to achieve the desired access to the memory devices 112A-112N. The controller 111 may further implement wear leveling, garbage collection, error detection and error-correcting code (ECC), encryption, caching, and address translations between logical block addresses (LBAs) and physical block addresses (PBAs). The controller 111 may further include host interface circuitry to communicate with the host system 120 via the physical host interface. The host interface circuitry may convert the commands received from the host system into command instructions to access the memory devices 112A-112N as well as convert responses associated with the memory devices 112A-112N into information for the host system 120. In certain implementations, the controller 111 may be responsible for moving the data that is stored on the volatile memory devices to non-volatile memory devices (e.g., responsive to detecting a power failure or other pre-defined event), in order to provide persistent storage of all data written to the storage system 110. Responsive to detecting a symmetric pre-defined event (e.g., the storage system power-up), the controller 110 may move the data back to non-volatile memory devices.

In order to implement the systems and methods of the present disclosure, the controller 111 may include a block allocation functional component 115 that may be employed to allocate physical blocks (including overprovisioned blocks) and maintain mappings of logical block addresses (LBAs) to physical block addresses (PBAs) referencing memory blocks residing on memory devices 112A-112N. It should be noted that the component designation is of a purely functional nature, i.e., the functions of the block allocation component 115 may be implemented by one or more hardware components and/or firmware modules of the controller 111, as described in more detail herein below. Furthermore, the storage system 110 may include additional circuitry or components that are omitted from FIG. 1 for clarity and conciseness.

Figure 2:
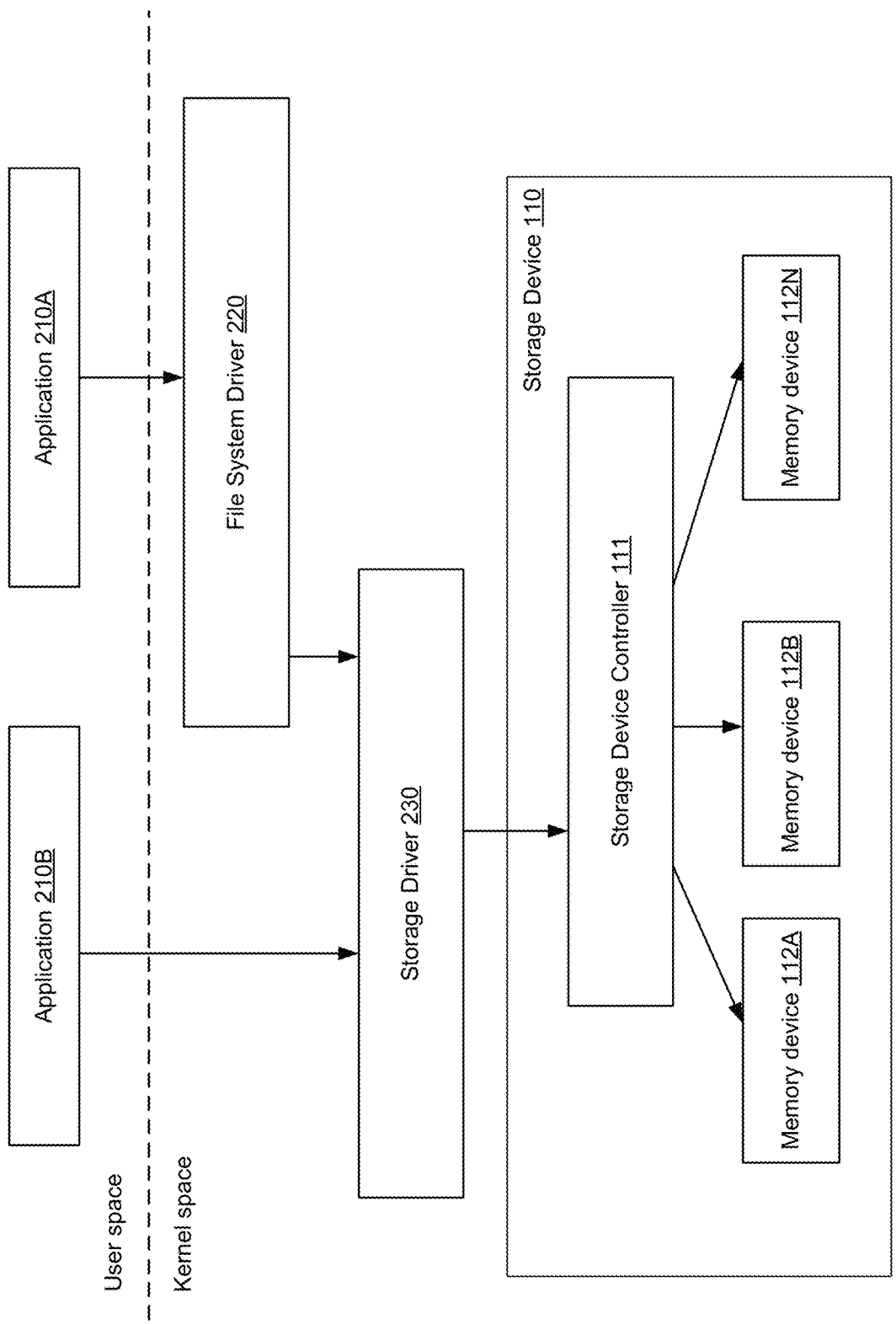
FIG. 2 schematically illustrates a programming model which may be implemented by a host system in communication with a controller managing one or more storage systems, in accordance with one or more aspects of the present disclosure.

FIG. 2 schematically illustrates a programming model which may be implemented by the host system 120 in communication with the controller 111 managing one or more memory devices 112A-112N, in accordance with one or more aspects of the present disclosure. As schematically illustrated by FIG. 2, the host system may execute one or more applications 210A-210B. In an illustrative example, the application 210A may be in communication with the file system driver 220, which may be running in the kernel space of the host system 120 and may be employed for processing certain system calls, such as read and write calls initiated by one or more applications 210, including the application 210A, running in the user space of the host system 120. The file system driver 220 may be employed to translate the read, write, and other system calls issued by the application 210A into low-level application programming interface (API) calls to the storage driver 230, which, in turn may communicate to the device controller 111 controlling one or more memory devices 112A-112N. The storage driver 230 may be running in the kernel mode of the host system and may be employed to process API calls issued by the file system driver 220 and/or system calls issued by the application 210B into storage interface commands to be processed by the storage the device controller 111 managing one or more memory devices 112A-112N.

Conceptually, the entire memory space of the memory devices 112A-112N may be represented by a set of blocks, such that each of block comprises a fixed number (e.g., 64) of memory pages (e.g., 4 kilobyte pages). User data pages, addressable by LBAs may be written to free memory pages, addressable by PBAs. The controller 111 may maintain a memory data structure comprising a plurality of LBA-PBA mappings. The storage driver 230 may expose, to the applications running on the host system 120, the block storage model, which may implement "read" and "write" command for storing and retrieving blocks of data identified by LBAs.

As noted herein above, the controller 111 may implement the relocate-on-write strategy, according to which a new data item replacing or modifying an existing data is written to a new physical location, thus invalidating the old physical location holding the data being overwritten. Accordingly, when a user data page addressed by an LBA is updated, a free physical memory page on one of memory devices 112A-112N is allocated, the updated user data is stored to the newly allocated physical memory page, and the corresponding LBA-PBA mapping is updated accordingly: the LBA is mapped to the PBA of the newly allocated memory page, and the old PBA (referencing the physical memory page storing the user data before the update) is marked as invalidated physical memory page. In certain implementations, the controller 111 may allocate sequential PBAs in stripes that span several memory devices 112, thus implementing data redundancy and error correction methods similar to those implemented by Redundant Array of Independent Disks (RAID).

Figure 3:
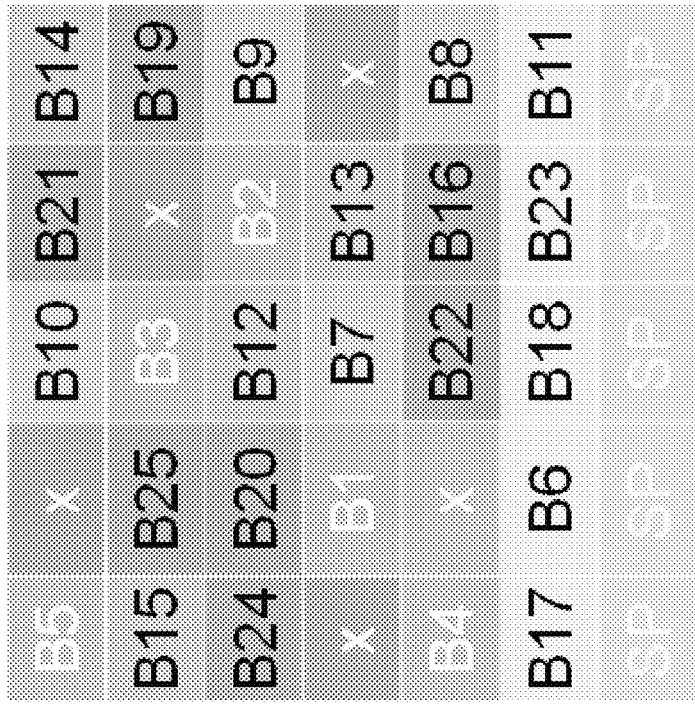
FIG. 3 schematically illustrates example memory states reflecting invalidating physical data pages by host-initiated write operations, in accordance with one or more aspects of the present disclosure.
Figure 3:
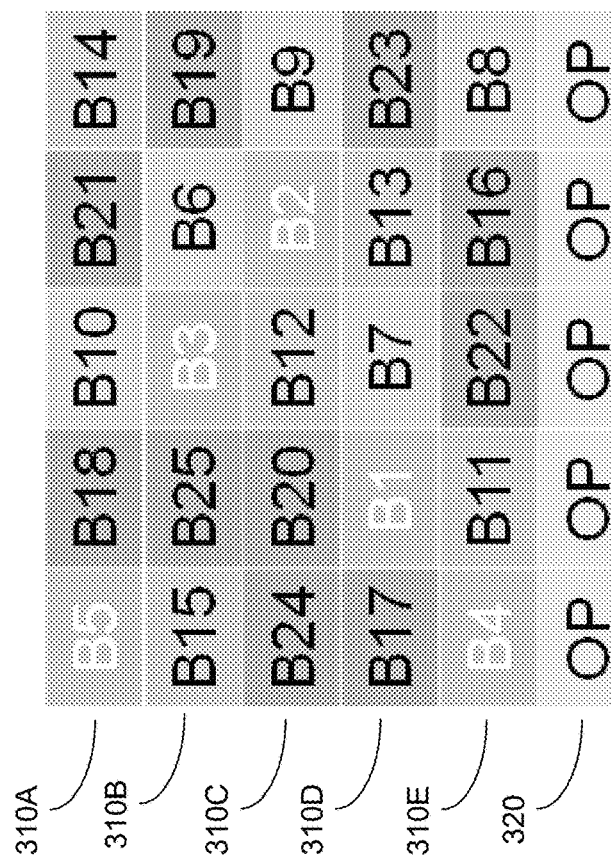
Figure 3:

As schematically illustrated by FIG. 3, host-initiated write operations may randomly invalidate physical data pages, thus creating multiple partially invalidated blocks, such that each partially invalidated block has one or more invalidated physical memory pages. In the illustrative example of FIG. 3, the initial physical memory state 300A includes five valid stripes of memory blocks 310A-310E. Due to the host's writing activity, several blocks become invalidated, and all overprovisioned blocks 320 may be utilized for storing the data that was previously stored by the invalidated blocks, as shown by the updated physical memory state 300B. The garbage collection process may select the stripe 310D as having the minimum number of the valid physical blocks, also referred to as translation units (TUs). Valid memory pages of the selected "victim" block may be relocated to another block, and the whole victim block may be erased. Therefore, the write amplification may reflect the behavior of the victim block. Simulations have shown that the distribution of valid pages in a block converges to a steady state distribution. Accordingly, the write amplification would converge to a steady state value, which may be determined as follows:

$W=((1+p)/p)/2$, where p is the overprovisioning factor.

However, real life workloads may differ significantly by their data invalidation rates. Therefore, selecting the victim block having the minimum number of valid TUs may not always yield the optimal efficiency (e.g., measured by the write amplification). The present disclosure provides a method of allocating overprovisioned blocks on a per-stream basis, thus yielding consistent write amplification by all currently active data streams.

Referring again to FIG. 2, the applications 210A-210B and/or the storage driver 230 executed by the host system 120 may group, into several data streams, the data to be written to the memory devices 112, such that the data items belonging to the same data stream would share one or more data attributes. In an illustrative example, a data attribute shared by the data items of a data stream may reflect the expected retention time or data invalidation rate of the data stream (also referred to as the "stream temperature"), such that a "hot" data stream would mostly comprise short-living data items which are likely to be overwritten within a relatively short period of time (e.g., a period of time falling below a pre-defined low threshold), while a "cold" data stream would mostly comprise static data items which are not likely to be overwritten for a relatively long period of time (e.g., a period of time exceeding a pre-defined high threshold). In an illustrative example, the data stream temperature may be communicated to the storage driver 230 by the application 210 which produces the data stream and thus is presumably aware of its expected data invalidation rate. The data stream temperature may be communicated to the storage driver 230, e.g., via an Input/Output Control (IOCTL) system call. Alternatively, the data stream temperature may be determined by the storage driver 230, which may buffer the incoming data to be written to the memory devices 112A-112N, and may estimate the expected data invalidation rate based on the average frequency of overwrite operations requested by the application 210 with respect to one or more data items to be written to the memory devices 112A-112N. The storage driver 230 may then group the buffered data to be written to the storage system 110 into two or more data streams, and may issue write stream commands indicating the data stream temperature to the controller 111. The write stream command may include, among other fields, the operation code specifying the command type, the LBA of the data being stored, the flags specifying various command parameters, and the stream identifier. One or more commands associated with each data stream may specify the values of one or more data stream attributes.

As noted herein above, selecting for garbage collection the victim block having the minimum number of valid TUs may not always yield the optimal efficiency (e.g., measured by the write amplification), since the data invalidation rate may differ significantly among blocks allocated to different data streams. The invalidation rate may be estimated as follows:

$$I=(1-((1+OP)/TU_{ph}))^{\hat{}} TU_{block}*N_{bl},$$

where I is the invalidation rate,
OP is the overprovisioning factor,
$TU_{ph}$ is the number of physical translation units,
$TU_{block}$ is the number of translation units per block, and
$N_{bl}$ is the input workload (in blocks).

Figure 4:
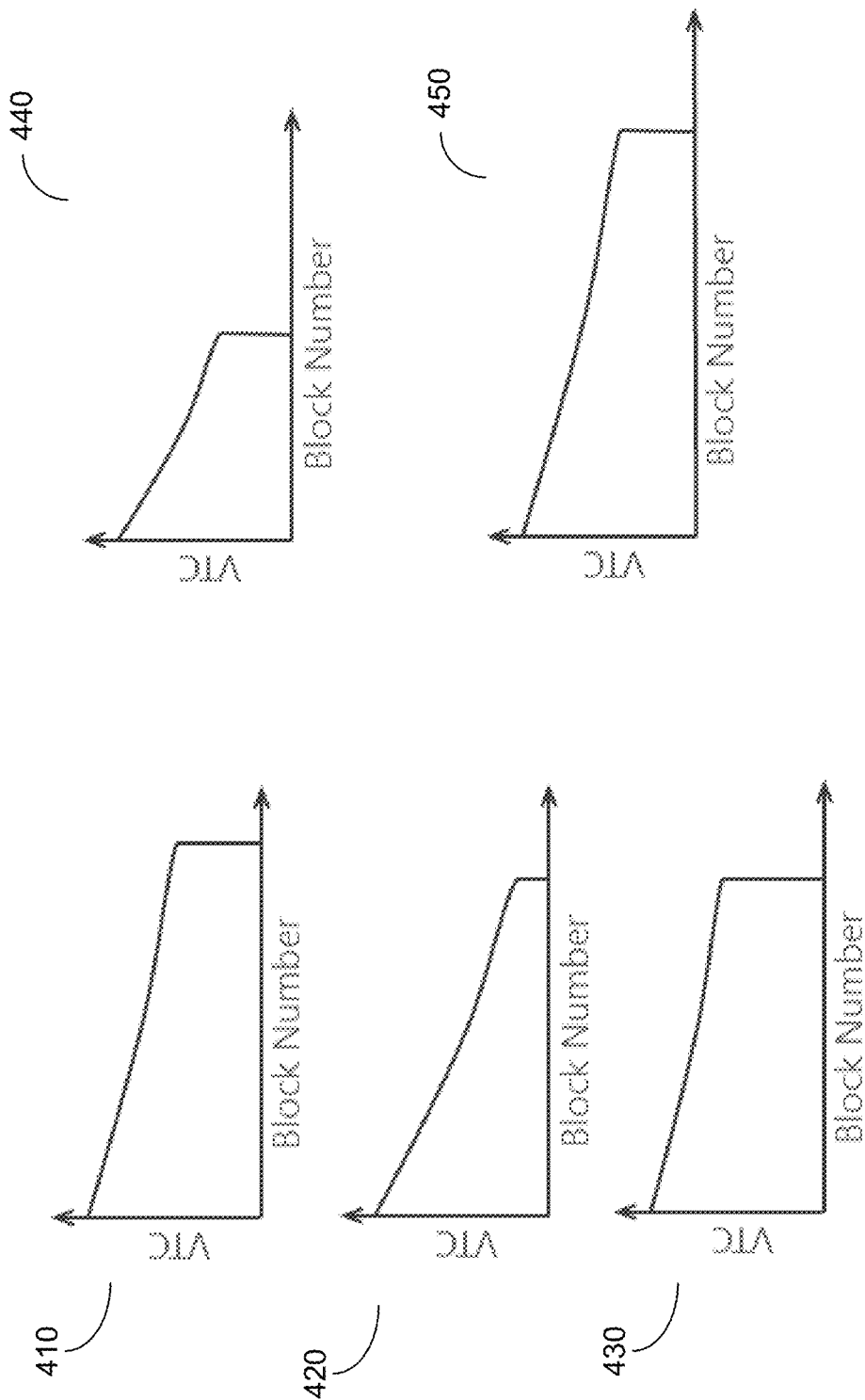
FIG. 4 schematically illustrates simulated distributions of valid transaction unit counts (VTCs) over the memory device blocks for various single-stream and multi stream host writing patterns, in accordance with one or more aspects of the present disclosure.

FIG. 4 schematically illustrates simulated distributions of valid TU counts (VTCs) over the memory device blocks for various single-stream and multi stream host writing patterns. The simulated distributions depicted by graphs 410-430 are based on the above equation for estimating the invalidation rate. The simulated distributions share a common overprovisioning factor. The graph 410 illustrates the VTC distribution in a single-stream scenario, in which all data written by the host is send to the device controller without subdividing the data items into streams. The graph 420 illustrates the VTC distribution for a hot data stream in a multi-stream host operation. The graph 430 illustrates the VTC distribution for a cold data stream in a multi-stream host operation. As seen from these graphs, the slope of the nearly-linear distribution is steeper for the hot data stream (graph 420) than for the cold data stream (graph 430), which illustrates the noticeably higher data invalidation rate of the hot data stream.

The write amplification may be defined as follows:

$$WA=1(1-I),$$

where WA is the write amplification, and
I is the invalidation rate.

Therefore, the differences in VTC distributions in the simulated scenarios depicted by graphs 420-430 would necessarily manifest themselves in noticeably different write amplification factors. Conversely, equal or similar data invalidation rates would produce equal or similar write amplification factors. Accordingly, a uniform distribution of VTC across all media blocks may be achieved by allocating overprovisioned blocks on a per-stream basis, thus yielding consistent write amplification by all currently active data streams. In an illustrative example, the controller may determine overprovisioning factors associated with each of two or more data streams that would minimize the differences between the write amplification factors associated with the data streams:

$$OP=\mathrm{argmin}\Sigma|WA_i(OP_i)-WA_j(OP_j)|, i=1,\ldots,N,$$
$$j=i+1,\ldots,N,$$

where $OP=(OP_1, OP_2, \ldots, OP_N)$ is the vector of overprovisioning factors for the data streams,
N is the number of the data streams, and
$WA_i$ is the expected write amplification factor of the data blocks storing the data items of the i-th data stream.

The controller may then allocate overprovisioned blocks to the data streams in accordance with calculated overprovisioning factors. Allocation of the overprovisioned data blocks may be reflected in a memory data structure comprising a plurality of records, such that each record would map a data stream identifier to the identifiers of overprovisioned blocks allocated to the identified data stream.

As noted herein above, increasing the number of overprovisioned blocks effectively increases the number of invalid pages which may exist before the garbage collection needs to be performed. Taking into account that the data invalidation rate of data items of a cold data stream may be significantly lower than the data invalidation rate of data items of a hot data stream, the overprovisioning factor associated with a given data stream may be chosen based on the data stream temperature, such that the overprovisioning factor of a "cold" data stream would exceed the overprovisioning factor of a hot data stream, in order to yield a uniform distribution of VTC across all data streams.

Figure 5B:
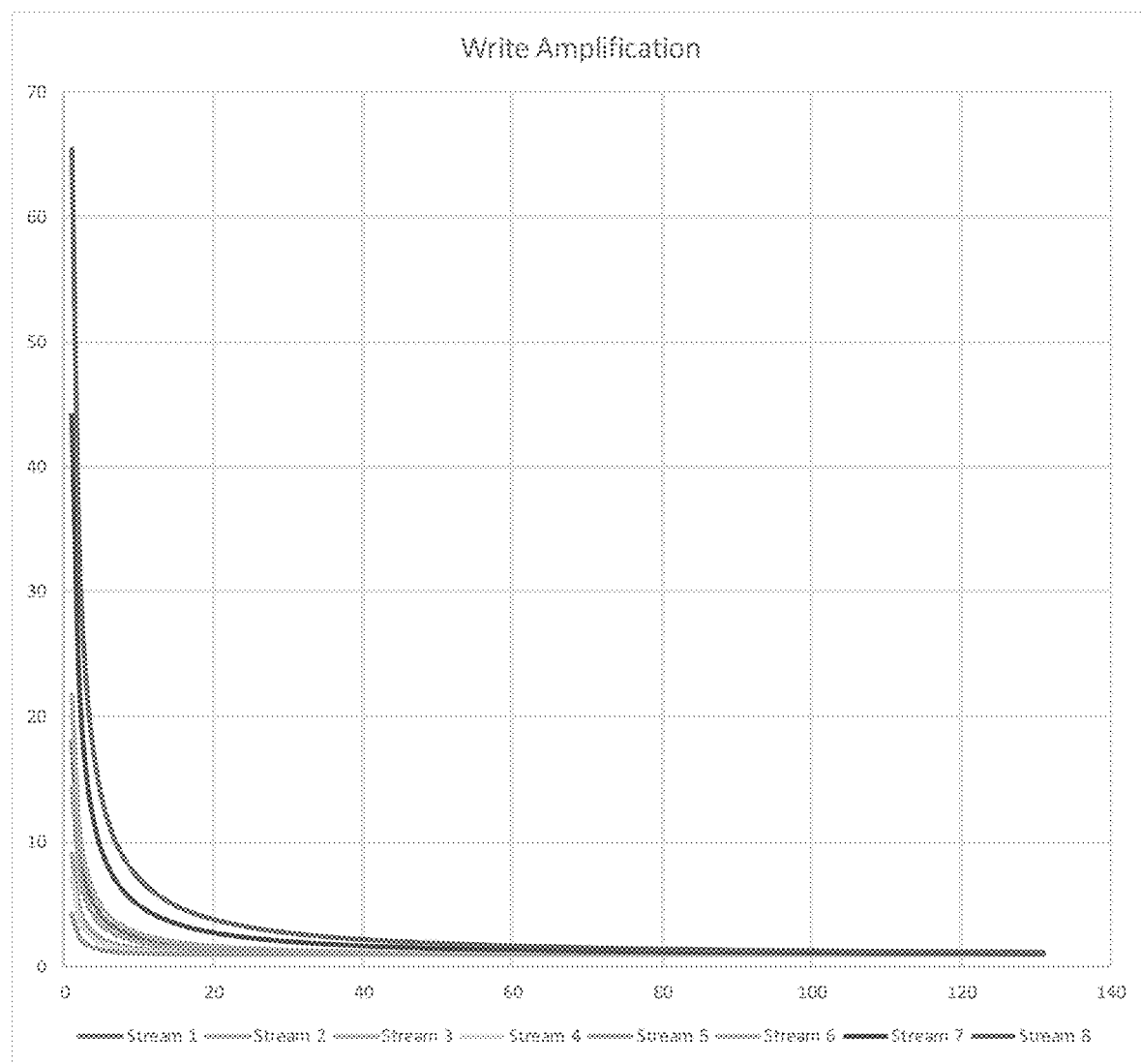

FIGS. 5A-5B schematically illustrate example simulation results for several data streams having various data invalidation rates, in accordance with one or more aspects of the present disclosure. As shown in FIG. 5A, the data streams represented by column 500A-500G have different data invalidation rates. The row 510 shows the respective overprovisioning factors assigned to respective data streams. The columns of the table show the write amplification factors under the simulated work load. As seen from FIG. 5A, the write amplification factors converge to the values of approximately 1.237 when the garbage collection procedure is triggered. FIG. 5B illustrates the graphs corresponding to each of the data streams represented by column 500A-500G of FIG. 5A, where each graph shows the write amplification factor under the simulated work load of the respective data stream. As seen from FIGS. 5A-5B, the simulation results confirm that choosing overprovisioning factors on a per-stream basis, such that such that the overprovisioning factor of a "cold" data stream would exceed the overprovisioning factor of a hot data stream may yield a uniform distribution of write amplification factors across all data streams.

Figure 6:
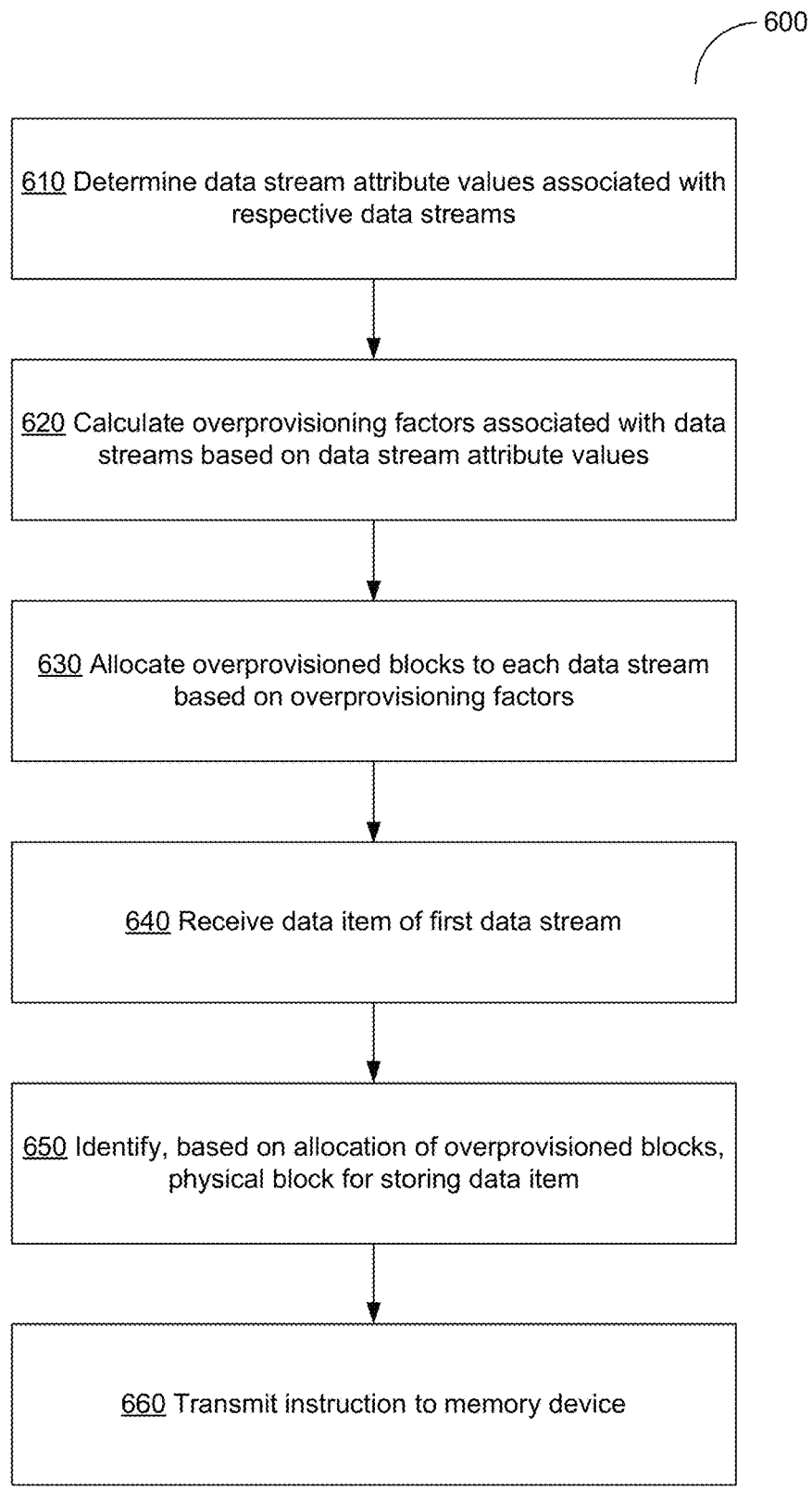
FIG. 6 is a flow diagram of an example method of allocation of overprovisioned blocks for minimizing write amplification in solid state drives, in accordance with one or more aspects of the present disclosure.

FIG. 6 is a flow diagram of an example method 600 of allocation of overprovisioned blocks for minimizing write amplification in solid state drives, in accordance with one or more aspects of the present disclosure. The method 600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In certain implementations, the method 600 may be performed by the controller 111 of FIG. 1.

As shown in FIG. 6, at block 610, the processing logic implementing the method may determine data stream attribute values associated with respective data streams. In an illustrative example, the data stream attributes may reflect expected or actual media usage patterns. Examples of such attributes include the data retention time or the data invalidation rate (also referred to as the "stream temperature"). The values of data stream attributes may be specified by the host and may be encoded into one or more commands transmitted by the host to the storage system controller implementing the method.

At block 620, the processing logic may calculate, based on the data stream attribute values, overprovisioning factors to be associated with each data stream. In certain implementations, the processing logic may determine overprovisioning factors that would minimize the differences between the expected write amplification factors associated with the data streams. In an illustrative example, the overprovisioning factor of a "cold" data stream may be chosen to exceed the overprovisioning factor of a hot data stream, in order to yield a uniform distribution of VTC across all data streams, as described in more detail herein above.

At block 630, the processing logic may allocate overprovisioned blocks to each data stream based on the calculated overprovisioning factors. Allocation of the overprovisioned data blocks may be reflected in a memory data structure comprising a plurality of records, such that each record would map a data stream identifier to identifiers of physical blocks, including the overprovisioned blocks, allocated to the identified data stream, as described in more detail herein above.

At block 640, the processing logic may receive write command specifying a data item associated with one of the data streams.

At block 650, the processing logic may identify, based on the data structure reflecting the block allocation to the data streams, a physical block for storing the received data item.

At block 660, the processing logic may transmit, to the memory device holding the identified physical block, an instruction specifying the data item to be stored, as described in more detail herein above.

Therefore, as shown by the foregoing description, aspects of the present disclosure represent significant improvements over various common implementations of storage systems, by allocating overprovisioned blocks to data stream based on data attributes (such as expected retention time or data invalidation rate), in order to optimize performance, endurance, and/or other operational aspects of the storage media.

Figure 7:
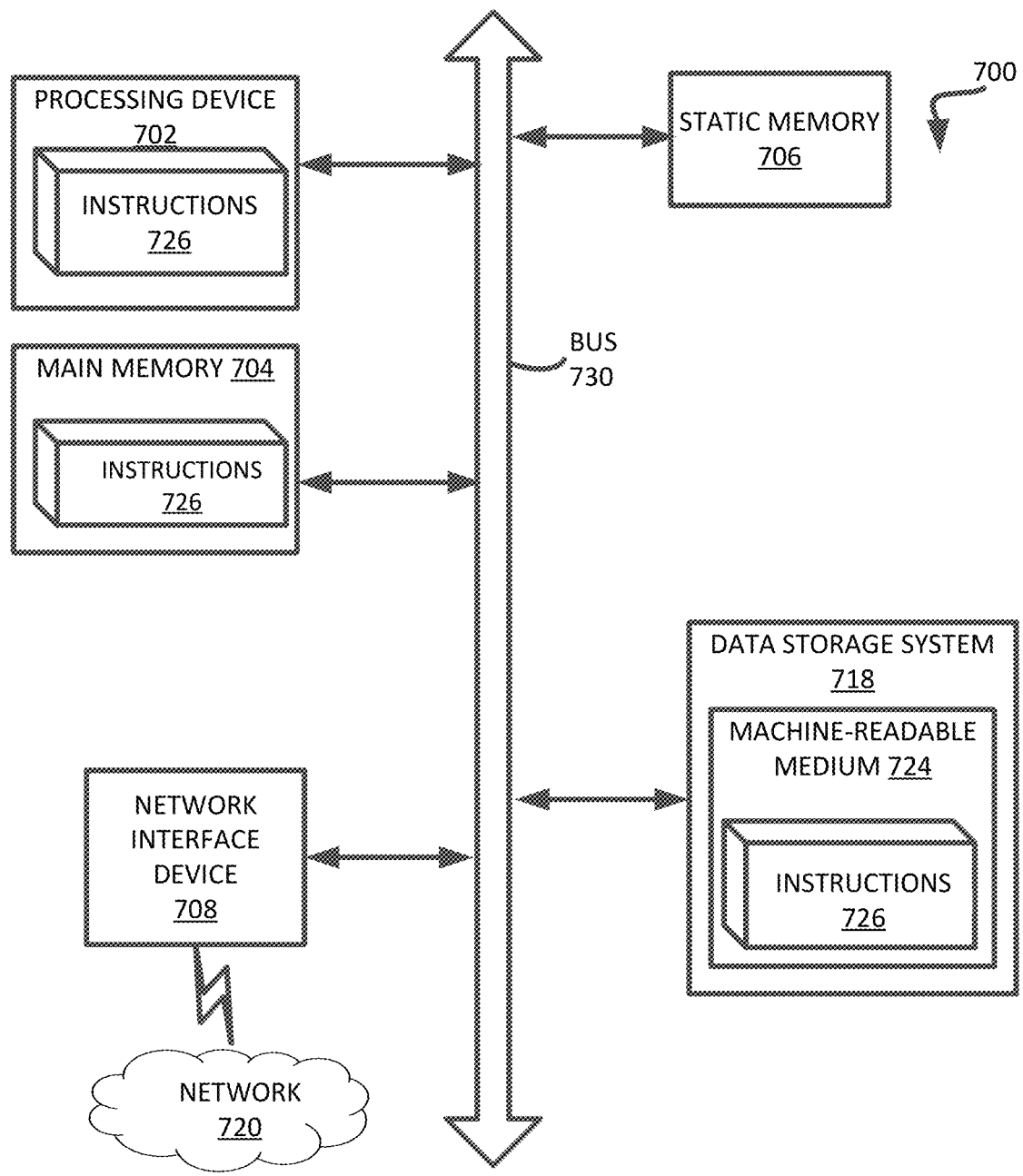
FIG. 7 schematically illustrates a block diagram of an example computer system in which implementations of the present disclosure may operate.

FIG. 7 illustrates an example machine of a computer system 700 within which a set of instructions, for causing the machine to perform any one or more of the methodologies discussed herein, may be executed. For example, the computer system 700 may correspond to a host system (e.g., the host system 120 of FIG. 1) that includes or utilizes a storage system (e.g., the storage system 110 of FIG. 1) or may be used to perform the operations of a controller (e.g., the block allocation functional component 115 of FIG. 1). In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730. Processing device 702 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 may further include a network interface device 708 to communicate over the network 720.

The data storage system 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 may correspond to the storage system 110 of FIG. 1.

In one implementation, the instructions 726 include instructions to implement functionality corresponding to a parity data handler (e.g., parity data handler 113 of FIG. 1). While the machine-readable storage medium 724 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure may refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus may be specially constructed for the intended purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A storage system, comprising:
   a plurality of memory devices;
   a controller operatively coupled to the memory devices, the controller configured to:
   determine a first value of a data stream attribute associated with a first data stream;
   determine a second value of the data stream attribute associated with a second data stream;
   determine, based on the first value and the second value, a first overprovisioning factor associated with the first data stream and a second overprovisioning factor associated with the second data stream, wherein the first overprovisioning factor and the second overprovisioning factor are calculated to provide a uniform distribution of valid translation unit counts (VTCs) across the first data stream and the second data stream; and
   allocate, based on the first overprovisioning factor and the second overprovisioning factor, a first plurality of overprovisioned blocks to the first data stream and a second plurality of overprovisioned blocks to the second data stream.

2. The storage system of claim 1, wherein at least one memory device of the plurality of memory devices is provided by a negative-and (NAND) flash memory device.

3. The storage system of claim 1, wherein the first overprovisioning factor is represented by a ratio of a number of physical memory blocks to a number of logical memory blocks presented as available memory to a host in communication with the storage system.

4. The storage system of claim 1, wherein the controller is further to:
   maintain a memory data structure associating a plurality of physical blocks with the first data stream, wherein the plurality of physical blocks includes a plurality of overprovisioned blocks allocated based on the first overprovisioning factor.

5. The storage system of claim 4, wherein the controller is further to:
   receive a data item associated with the first data stream;
   identify, using the memory data structure, a physical block for storing a data stream; and
   transmit, to a memory device holding the identified physical block, an instruction specifying the data item.

6. The storage system of claim 1, wherein the data stream attribute reflects an expected media usage pattern.

7. The storage system of claim 1, wherein the controller is further to:
   identify, among a plurality of physical blocks of the first data stream, a first physical block having a minimum number of valid VTCs;
   copy valid VTCs of the first physical block to a second physical block; and
   erase the first physical block.

8. A method, comprising:
   determining, by a storage system controller, a first value of a data stream attribute associated with a first data stream;
   determining a second value of the data stream attribute associated with a second data stream;
   determining, based on the first value and the second value, a first overprovisioning factor associated with the first data stream and a second overprovisioning factor associated with the second data stream, wherein the first overprovisioning factor and the second overprovisioning factor are calculated to provide a uniform distribution of valid translation unit counts (VTCs) across the first data stream and the second data stream; and
   allocating, based on the first overprovisioning factor and the second overprovisioning factor, a first plurality of overprovisioned blocks to the first data stream and a second plurality of overprovisioned blocks to the second data stream.

9. The method of claim 8, wherein at least one memory device of a plurality of memory devices is provided by a negative-and (NAND) flash memory device.

10. The method of claim 8, wherein the first overprovisioning factor is represented by a ratio of a number of physical memory blocks to a number of logical memory blocks presented as available memory to a host in communication with a storage system.

11. The method of claim 8, further comprising:
    maintaining a memory data structure associating a plurality of physical blocks with the first data stream, wherein the plurality of physical blocks includes a plurality of overprovisioned blocks allocated based on the first overprovisioning factor.

12. The method of claim 11, further comprising:
    receiving a data item associated with the first data stream;
    identifying, using the memory data structure, a physical block for storing a data stream; and
    transmitting, to a memory device holding the identified physical block, an instruction specifying the data item.

13. The method of claim 8, wherein the data stream attribute reflects an actual media usage pattern.

14. The method of claim 8, further comprising:
identifying, among a plurality of physical blocks of the first data stream, a first physical block having a minimum number of valid VTCs;
copying valid VTCs of the first physical block to a second physical block; and
erasing the first physical block.

15. A computer-readable non-transitory storage medium comprising executable instructions that, when executed by a processor, cause the processor to:
determine a first value of a data stream attribute associated with a first data stream;
determine a second value of the data stream attribute associated with a second data stream;
determine, based on the first value and the second value, a first overprovisioning factor associated with the first data stream and a second overprovisioning factor associated with the second data stream, wherein the first overprovisioning factor and the second overprovisioning factor are calculated to provide a uniform distribution of valid translation unit counts (VTCs) across the first data stream and the second data stream; and
allocate, based on the first overprovisioning factor and the second overprovisioning factor, a first plurality of overprovisioned blocks to the first data stream and a second plurality of overprovisioned blocks to the second data stream.

16. The computer-readable non-transitory storage medium of claim 15, wherein at least one memory device of a plurality of memory devices is provided by a negative-and (NAND) flash memory device.

17. The computer-readable non-transitory storage medium of claim 15, wherein the first overprovisioning factor is represented by a ratio of a number of physical memory blocks to a number of logical memory blocks presented as available memory to a host in communication with a storage system.

18. The computer-readable non-transitory storage medium of claim 15, further comprising executable instructions that, when executed by the processor, cause the processor to:
maintain a memory data structure associating a plurality of physical blocks with the first data stream, wherein the plurality of physical blocks includes a plurality of overprovisioned blocks allocated based on the first overprovisioning factor.

19. The computer-readable non-transitory storage medium of claim 18, further comprising executable instructions that, when executed by the processor, cause the processor to:
receive a data item associated with the first data stream;
identify, using the memory data structure, a physical block for storing a data stream; and
transmit, to a memory device holding the identified physical block, an instruction specifying the data item.

20. The computer-readable non-transitory storage medium of claim 15, further comprising executable instructions that, when executed by the processor, cause the processor to:
identify, among a plurality of physical blocks of the first data stream, a first physical block having a minimum number of valid VTCs;
copy valid VTCs of the first physical block to a second physical block; and
erase the first physical block.

* * * * *